(12) United States Patent
Nishikawa et al.

(10) Patent No.: US 6,209,604 B1
(45) Date of Patent: Apr. 3, 2001

(54) PNEUMATIC TIRE FOR PASSENGER CARS WITH SIDEWALL PORTIONS HAVING A RUBBER REINFORCING LAYER AND A RUBBER-FILAMENT FIBER COMPOSITE

(75) Inventors: Tomohisa Nishikawa; Kenji Matsuo; Kazuomi Kobayashi, all of Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/217,568

(22) Filed: Dec. 21, 1998

(30) Foreign Application Priority Data

Dec. 22, 1997 (JP) .................................................. 9-353766

(51) Int. Cl.⁷ .............................. B60C 9/00; B60C 13/00; B60C 17/00; B60C 9/04
(52) U.S. Cl. ......................... 152/458; 152/517; 152/555; 152/556
(58) Field of Search .................................... 152/458, 517, 152/555, 556

(56) References Cited

U.S. PATENT DOCUMENTS

| 4,067,372 | 1/1978 | Masson . |
| 4,121,641 | 10/1978 | Nakasaki . |
| 5,217,549 | 6/1993 | Johnson . |

FOREIGN PATENT DOCUMENTS

| 0 613 795 B1 | * 5/1997 | (EP) . |
| 50-21722 | 7/1975 | (JP) . |
| 62-29404 | 2/1987 | (JP) . |
| 62-29405 | 2/1987 | (JP) . |
| 8-40023 | 2/1996 | (JP) . |
| 9-20109 | 1/1997 | (JP) . |
| 9-48211 | 2/1997 | (JP) . |
| 9-48219 | 2/1997 | (JP) . |
| 9-202111 | 8/1997 | (JP) . |
| 9-202118 | 8/1997 | (JP) . |
| 9-226315 | 9/1997 | (JP) . |
| 9-263106 | 10/1997 | (JP) . |
| 10-44710 | 2/1998 | (JP) . |
| 10-44722 | 2/1998 | (JP) . |
| 10-53010 | 2/1998 | (JP) . |
| 10-53012 | 2/1998 | (JP) . |
| 10-181307 | 7/1998 | (JP) . |
| 10-250322 | 9/1998 | (JP) . |
| 10-258608 | 9/1998 | (JP) . |
| 10-258610 | 9/1998 | (JP) . |
| WO 98/54008 | 12/1998 | (WO) . |
| WO98/54011 | 12/1998 | (WO) . |

OTHER PUBLICATIONS

Patent Abstracts of Japan, vol. 097, No. 007, Jul. 31, 1997 & JP 09–058229 A (Yokohama Rubber Co Ltd), Mar. 4, 1997.

* cited by examiner

Primary Examiner—Adrienne C. Johnstone
(74) Attorney, Agent, or Firm—Sughrue, Mion, Zinn, Macpeak & Seas, PLLC

(57) ABSTRACT

A pneumatic tire for passenger cars comprises bead cores, a carcass layer, a tread portion, and side wall portions, wherein a rubber reinforcing layer having a crescent-shaped cross-section and at least one sheet of a rubber-filament fiber composite having a thickness measured under a pressure of 20 g/cm² of 0.05 to 2.0 mm which is formed from a rubber component and filaments having a diameter or a maximum cross-sectional dimension of 0.0001 to 0.1 mm and a length of 8 mm or more are disposed in said side wall portions. Reinforcing cords of carcass plies are made of an aliphatic polyamide fiber having a melting point of 250° C. or higher.

7 Claims, 16 Drawing Sheets

STRUCTURE 11

STRUCTURE III

F I G. 6
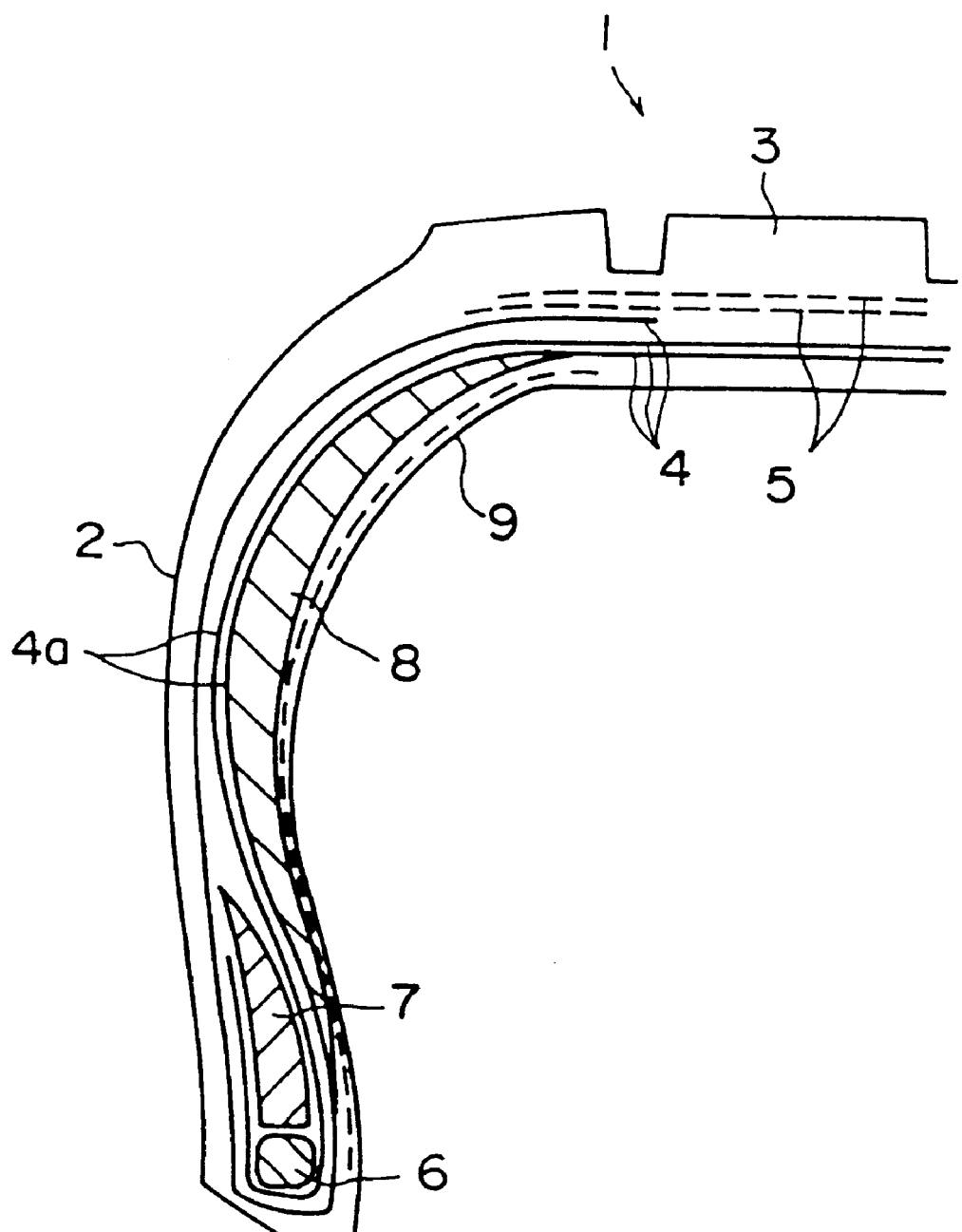
STRUCTURE IV

STRUCTURE V

PNEUMATIC TIRE FOR PASSENGER CARS WITH SIDEWALL PORTIONS HAVING A RUBBER REINFORCING LAYER AND A RUBBER-FILAMENT FIBER COMPOSITE

BACKGROUND OF THE INVENTION

1. Field of the Invention

The present invention relates to a pneumatic tire for passenger cars, and more particularly to a pneumatic tire for passenger cars which has excellent durability and can be safely used even when the internal pressure of the tire is reduced.

2. Description of the Related Art

Cords of aliphatic polyamide fibers such as nylon 66 fiber are frequently used as reinforcing cords for tires because of their high strength and excellent resistance to wear. However, these cords do not always give satisfactory results when they are used for pneumatic tires as passenger cars.

Pneumatic tires for passenger cars have been improved remarkably in recent years by the use of cords of polyester fibers which show excellent dimensional stability and have high strength in place of the above fibers for reinforcement of the tires.

Among the polyester fibers, polyethylene terephthalate fibers (PET) are generally used as the reinforcing material for rubber such as tire cords because PET has a Young's modulus higher than that of nylon 66 fiber and about the same as that of rayon and shows a better balance of physical properties than other fiber materials.

However, PET exhibits inferior dimensional stability under heating because of a decrease in the Young's modulus although PET has a relatively high Young's modulus at room temperature. Therefore, in spite of the high Young's modulus, PET manufactured to suit industrial applications such as the reinforcement of rubber has a drawback in that the Young's modulus decreases under heating to about the same value as that of general use PET used for clothing.

Polyethylene naphthalate fibers (PEN) stretched sufficiently by a heat treatment show a Young's modulus almost twice that of PET at room temperature. Moreover, PEN has a Young's modulus as high as 100 g/d or more at 100° C. or higher and exhibits excellent dimensional stability under heating such as a dry heat shrinkage of 2% or less at 150° C. Therefore, the application of PEN as the reinforcing material of rubber such as tire cords has been attempted.

However, heat buildup inside a tire is extremely large when the tire is used with a lower internal pressure, i.e., under so-called run-flat conditions. Therefore, adhesion at high temperatures is not sufficient even when PET or PEN is used. The main cause of failure of a tire during use in a run-flat condition is separation at the interface of the PET or PEN and the adhesive layers.

SUMMARY OF THE INVENTION

The object of the present invention is to provide a pneumatic tire for passenger cars which shows excellent durability because separation at the interfaces of adhesive layers and reinforcing fibers does not take place during use, particularly during use in a run-flat condition, and a layer of a rubber-filament fiber composite is disposed at side wall portions of the tire.

As the result of studies in detail by the inventors on the behavior of carcass plies when used in a run-flat condition, it was found that a pneumatic tire for passenger cars showing an excellent durability can be provided when a specific aliphatic polyamide is used for the reinforcing cords and a rubber-filament fiber composite is disposed at the side wall portions. The present invention has been completed based on the above knowledge.

The present invention provides a pneumatic tire for passenger cars comprising:

a pair of left and right bead cores;

a carcass formed in which a plurality of reinforcing cords disposed parallel to each other are embedded in a coating rubber;

a tread layer disposed at an outer side of the carcass portion in the radial direction of the tire; and a pair of side wall portions disposed at the left and right of the tread portion;

wherein a rubber reinforcing layer having a crescent-shaped cross-section and at least one sheet of a rubber-filament fiber composite having a thickness of 0.05 to 2.0 mm which is formed from a rubber component and filament fibers having a diameter or a maximum cross-sectional dimension of 0.0001 to 0.1 mm and a length of 8 mm or more are disposed in each of the side wall portions; and the reinforcing cord of carcass ply is made of an aliphatic polyamide fiber having a melting point of 250° C. or higher as measured by differential scanning calorimetry (DSC).

It is preferable that the filament fiber in the rubber-filament fiber composite is a fiber selected from the group consisting of aromatic polyamide fiber, rayon fiber, polyethylene naphthalate fiber, polyimide fiber, carbon fiber, glass fiber and steel wire, that the filament fiber in the rubber-filament fiber composite has a diameter or a maximum cross-sectional dimension of 0.0001 to 0.005 mm and a length of 10 mm or more, that the content of the filament fiber in said rubber-filament fiber composite is 4 to 50% by weight, that said rubber-filament fiber composite is formed from a rubber and a nonwoven fabric having a weight per area of 10 to 300 g/m$^2$, that said nonwoven fabric has a thickness of 0.1 to 0.5 mm and that said reinforcing cord of carcass ply is made of nylon 66 fiber or nylon 46 fiber.

BRIEF DESCRIPTION OF THE DRAWINGS

FIG. 6 shows a schematic presentation of the structure of a side portion (a carcass portion) of the pneumatic safe tire used in another example of the present invention.

DESCRIPTION OF THE PREFERRED EMBODIMENTS

Figure 1:
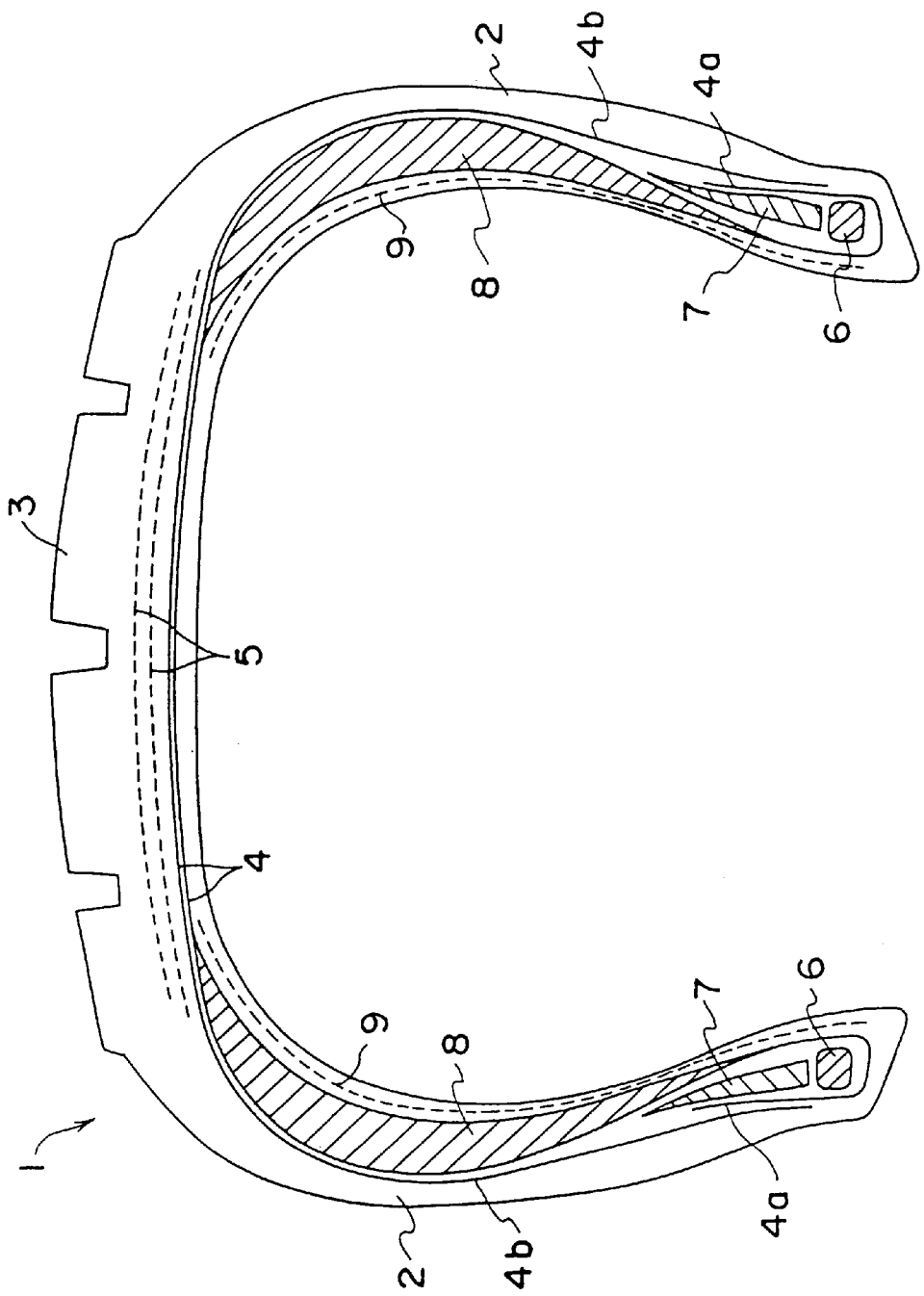
FIG. 1 shows a schematic cross sectional view of an example of the pneumatic safe tire of the present invention.

The reinforcing cord of the carcass ply of the pneumatic tire for passenger cars of the present invention is made of an aliphatic polyamide fiber having a melting point of 250° C. or higher as measured by differential scanning calorimetry (DSC). By the use of this fiber, strong adhesion between rubber parts and the fiber can be obtained even at high temperatures and deterioration of the adhesion in carcass ply can be prevented.

A stabilizer such as one comprising a copper salt and an antioxidant may be added to the polyamide fiber in order to provide the fiber with resistance to heat, light, and oxygen.

As the aliphatic polyamide fiber used for the reinforcing cord of the carcass ply of the pneumatic tire for passenger cars of the present invention, nylon 66 fiber or nylon 46 fiber is preferable in view of their adhesive properties at a high temperature.

When the melting point of the reinforcing cord of the carcass ply as measured by DSC is lower than 250° C., durability when used in a run-flat condition is inferior because it becomes difficult to maintain the shape of the tire at a high temperature.

The filament fiber used in the rubber-filament fiber composite which is used as a layer of a fiber reinforcing component in the present invention is not formed into twisted or woven bundles of multiple fibers like the cord fabric for tire fiber cords, and a nonwoven fabric is preferably used.

As the material of the filament fiber used in the rubber-filament fiber composite, a fiber selected from natural polymeric fibers such as cotton, rayon, and cellulose; synthetic polymeric fibers such as aromatic polyamide fibers, aliphatic polyamide fibers, polyester fibers, polyvinyl alcohol fibers, and polyimide fibers; carbon fibers; glass fibers; and steel wires may be used by themselves or in combination with any of the above fibers. Among these fibers, aromatic polyamide fibers, rayon fibers, polyethylene naphthalate fibers, polyimide fibers, carbon fibers, glass fibers, and steel wires are preferable in view of their dimensional stability at high temperatures. Specific examples of the aromatic polyamide fiber include poly-para-phenyleneterephthalamide, poly-meta-phenylene-terephthalamide, poly-para-phenyleneisophthalamide and poly-meta-phenyleneisophthalamide.

The diameter or the maximum cross-sectional dimension of the filament fiber forming the rubber-filament fiber composite must be in the range of 0.0001 to 0.1 mm and, preferably in the range of 0.0001 to 0.005 mm. The length of the filament fiber forming the rubber-filament fiber composite must be 8 mm or more and, preferably 10 mm or more. When the length of the filament fiber is less than 8 mm, entanglement of filament fibers is not sufficient and the strength required as a reinforcing layer cannot be maintained.

The cross-section of the filament fiber may have a circular shape or a shape other than a circle. The filament fiber may have a hollow structure. Moreover, conjugated fibers in which different materials are used in an outer layer and in an inner layer, a radiate structure, a petal structure, or a layered structure may also be used.

It is preferable that the content of the filament fiber in the rubber-filament fiber composite is 4 to 50% by weight. When the content of the filament fiber in the rubber-filament fiber composite is less than 4% by weight, uniformity of the composite may not be maintained and the rigidity required as a reinforcing layer may not able to be exhibited. Thus, such a content is not preferable. When the content exceeds 50% by weight, the content of the continuous layer of the fiber in the rubber-filament fiber composite is large and the durability of the rubber-filament fiber composite tends to decrease thereby decreasing the durability of the tire. Thus, such a content is not preferable, either.

In the rubber-filament fiber composite comprised in the pneumatic tire for passenger cars of the present invention, it is preferable that a nonwoven fabric is used.

As the process for producing the nonwoven fabric, the needle punch process, the carding process, the melt blow process, and the spun bond process are suitable. Particularly, nonwoven fabrics obtained by the carding process in which filaments are entangled with each other by using a water stream or needles, or by the spun bond process in which filaments are entangled with each other are preferably used.

The weight per area (the weight per 1 $m^2$) of the nonwoven fabric is preferably in the range of 10 to 300 g. When the weight per area exceeds 300 g/$cm^2$, rubber tends not to penetrate into the space inside the nonwoven fabric although the penetration may vary depending on the fluidity of the rubber. Such a weight per area is not preferable in view of the separation between the fabric and the rubber in the rubber-nonwoven fabric composite when the composite is used as a component of a tire. When the weight per area is less than 10 g, uneven nonwoven fabric may be obtained because maintaining uniformity of the nonwoven fabric itself becomes difficult and a composite prepared from the nonwoven fabric and rubber may show large random variations in strength, rigidity, and elongation at break after the composite is vulcanized. Thus, such a weight per area is not preferable.

The thickness of the nonwoven fabric measured under a pressure of 20 g/$cm^2$ is preferably in the range of 0.05 to 2.0 mm and more preferably in the range of 0.1 to 0.5 mm. When the thickness of the nonwoven fabric is less than 0.05 mm, maintaining uniformity of the nonwoven fabric becomes difficult, and a composite prepared from the nonwoven fabric and rubber has insufficient strength and rigidity. When the thickness exceeds 2.0 mm, the thickness of a composite prepared from the nonwoven fabric and rubber is increased and such a material is not preferable as a component of a tire.

To form the rubber-filament fiber composite, an unvulcanized rubber composition is applied to the fiber in advance while the components remain unvulcanized. Specifically, mixing may be conducted by using any method generally used in the rubber industry, such as a method using a roll or a Banbury mixer. It is preferable from the standpoint of dispersion of the fiber that the filament fiber is added in small portions. When a nonwoven fabric is used as the filament fiber, an unvulcanized rubber composition in a sheet form is pressed to one or both faces of the nonwoven fabric by using a press or a heat roll so that the air contained inside the nonwoven fabric is sufficiently replaced with the unvulcanized rubber composition. When the fluidity of the unvulcanized rubber composition is not sufficient, it may be necessary that the unvulcanized rubber composition is pressed at an elevated temperature but still within the range where substantially vulcanization does not start. In another method, the unvulcanized rubber composition is liquefied by using a solvent and applied to the nonwoven fabric to provide the fabric with tackiness. The unvulcanized composite thus obtained is applied to prepare a green tire, which is then vulcanized in a mold.

In the formation of the composite, the filament fiber may be used without any prior adhesive treatment when the adhesion of the filament fiber to the rubber is sufficient after vulcanization. However, when adhesion is insufficient, a dipping heat set treatment may be applied to the filament fiber in a similar manner to that used for enhancement of the adhesion between fiber cords for tires and rubber.

It is preferable that the rubber reinforcing layer having a crescent-shaped cross-section is disposed at the inner side of the carcass ply.

The rubber component used for the carcass ply, the rubber-filament fiber composite, and the rubber reinforcing layer is not particularly limited. Examples of the rubber component include natural rubber (NR), butadiene rubber (BR), styrene-butadiene rubber (SBR), and isoprene rubber (IR).

The physical properties of the rubber composition used for the composite, preferably are that the tensile stress at 50% elongation (M50) is 2 to 9 MPa and the tensile stress at 100% elongation ($M_{100}$) is 4 to 15 MPa.

The carcass ply used in the present invention can be prepared from the aliphatic polyamide cord and the rubber composition in accordance with a conventional process. The carcass ply thus prepared is applied to prepare a green tire, which is then vulcanized in a mold.

In the pneumatic tire of the present invention, the structure of the carcass, the size of the nonwoven-fabric and the position where the nonwoven fabric is disposed are not particularly limited. For example, the nonwoven-fabric can be disposed at the positions shown in Figs.

The reference numbers in the figures have the following meanings:

1: a pneumatic tire
2: a side wall portion
3: a tread portion
4: a carcass layer
4a: a turned up carcass ply
4b: a down carcass ply
5: a belt portion
6: a bead core
7: a bead filler
8: a rubber reinforcing layer
9: a rubber-filament fiber composite
10: a belt reinforcing layer
11: a belt reinforcing layer A structure of the pneumatic tire in accordance with the present invention will be described below with reference to the drawings.

An example of a schematic cross sectional view of the pneumatic safe tire of the present invention is show in FIG. 1.

Figure 2:
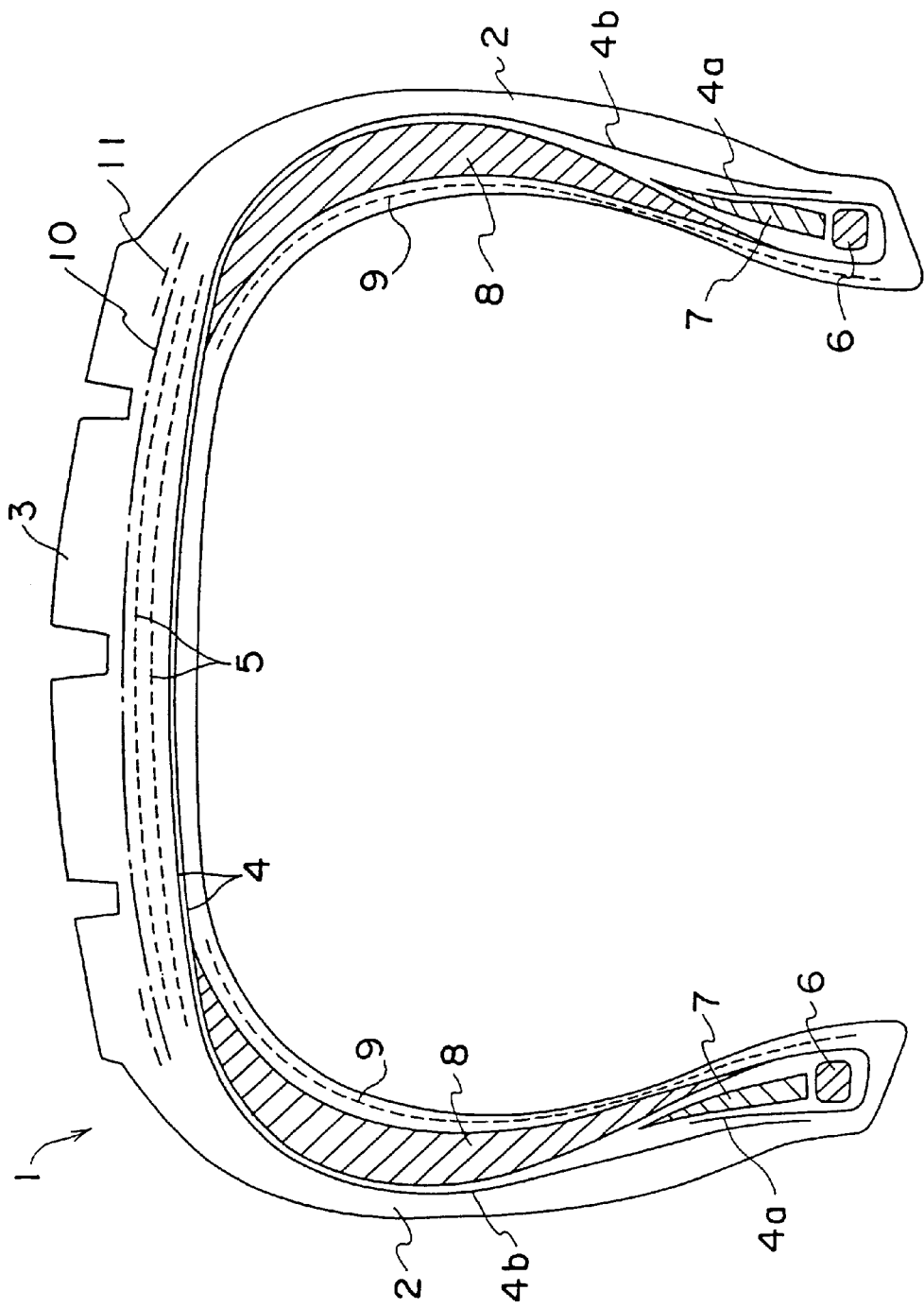
FIG. 2 shows a schematic cross sectional view of another example of the pneumatic safe tire of the present invention.
Figure 3:
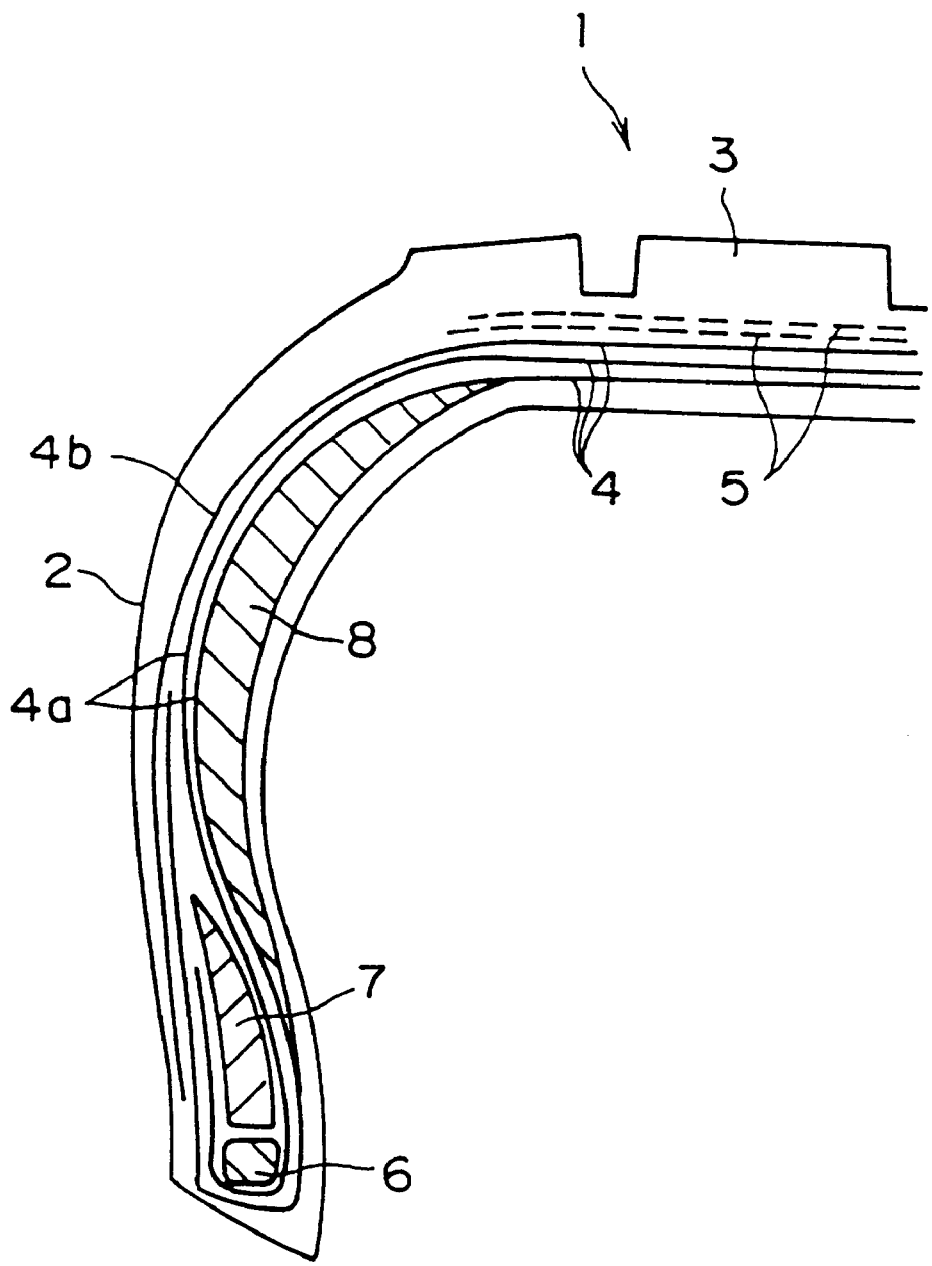
FIG. 3 shows schematic presentations of the structures of a side portion (a carcass portion) of the pneumatic safe tire used as an example of the present invention and as a comparative example.
Figure 4:
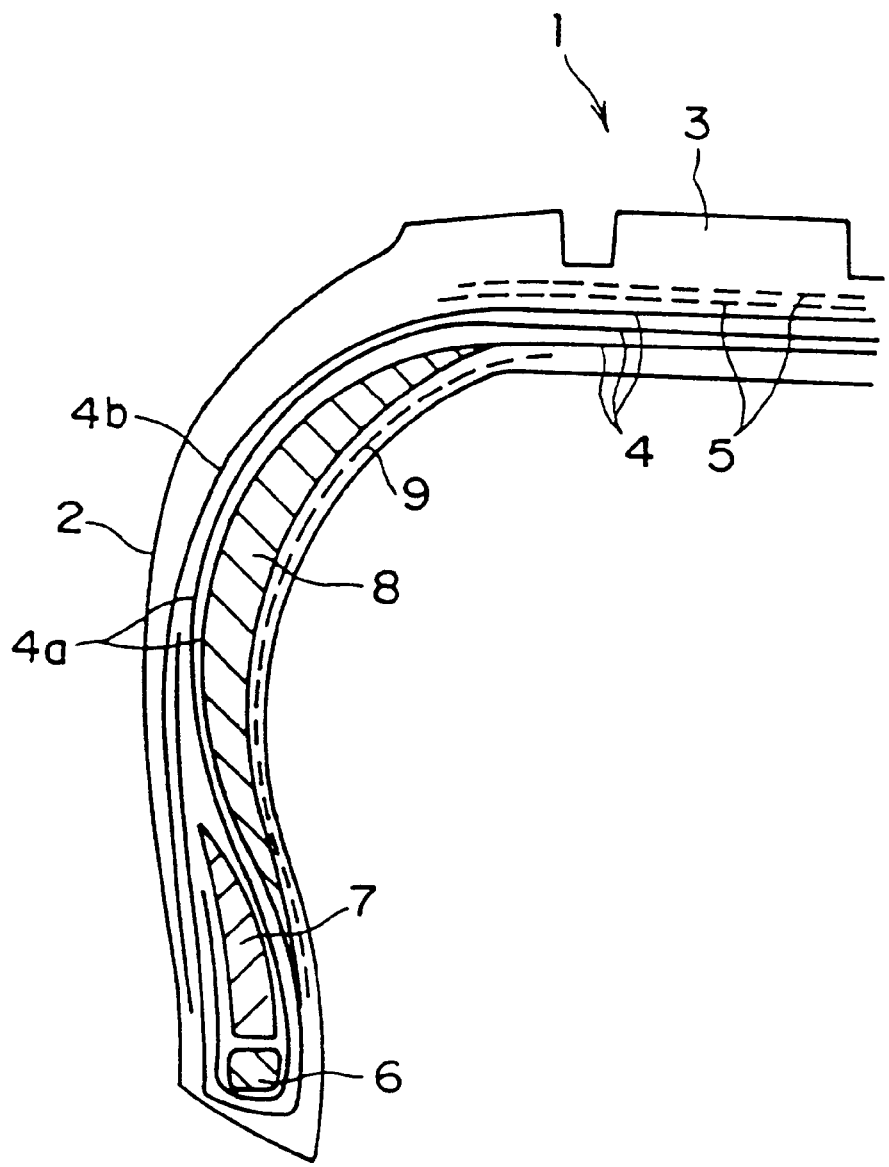
FIG. 4 shows a schematic presentation of the structure of a side portion (a carcass portion) of the pneumatic safe tire used in another example of the present invention.
Figure 5:
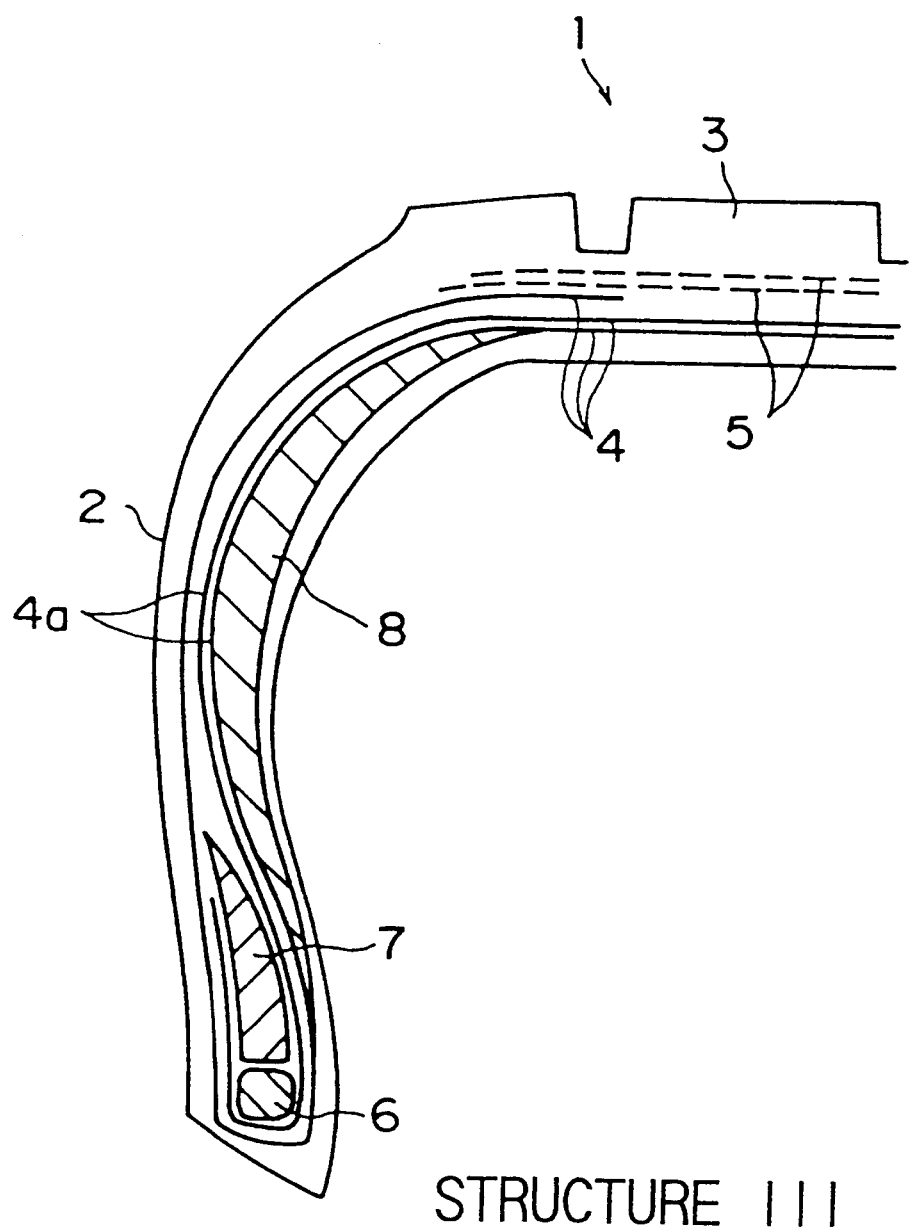
FIG. 5 shows a schematic presentation of the structure of a side portion (a carcass portion) of the pneumatic safe tire used in another example of the present invention.
Figure 7:
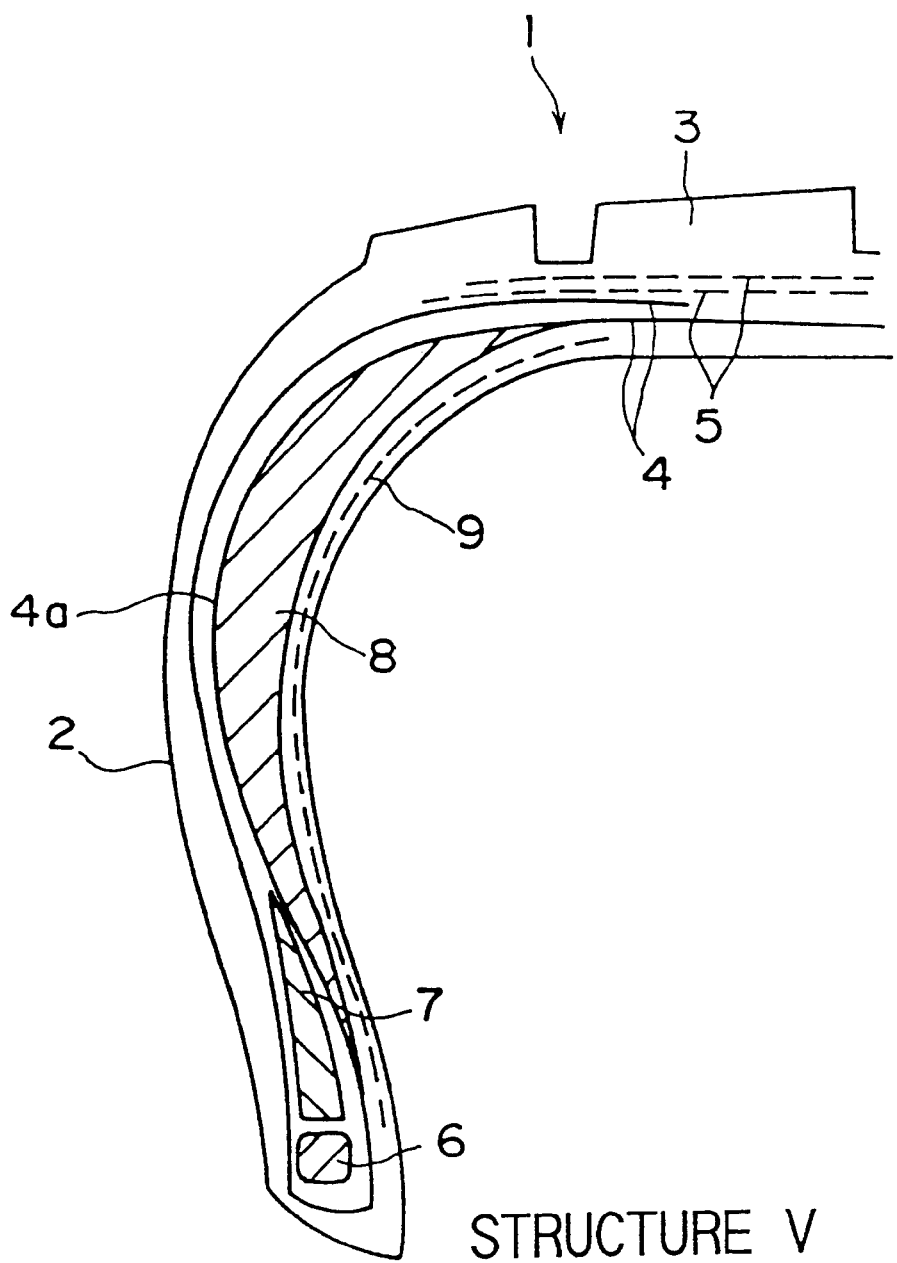
FIG. 7 shows a schematic presentation of the structure of a side portion (a carcass portion) of the pneumatic safe tire used in another example of the present invention.
Figure 8:
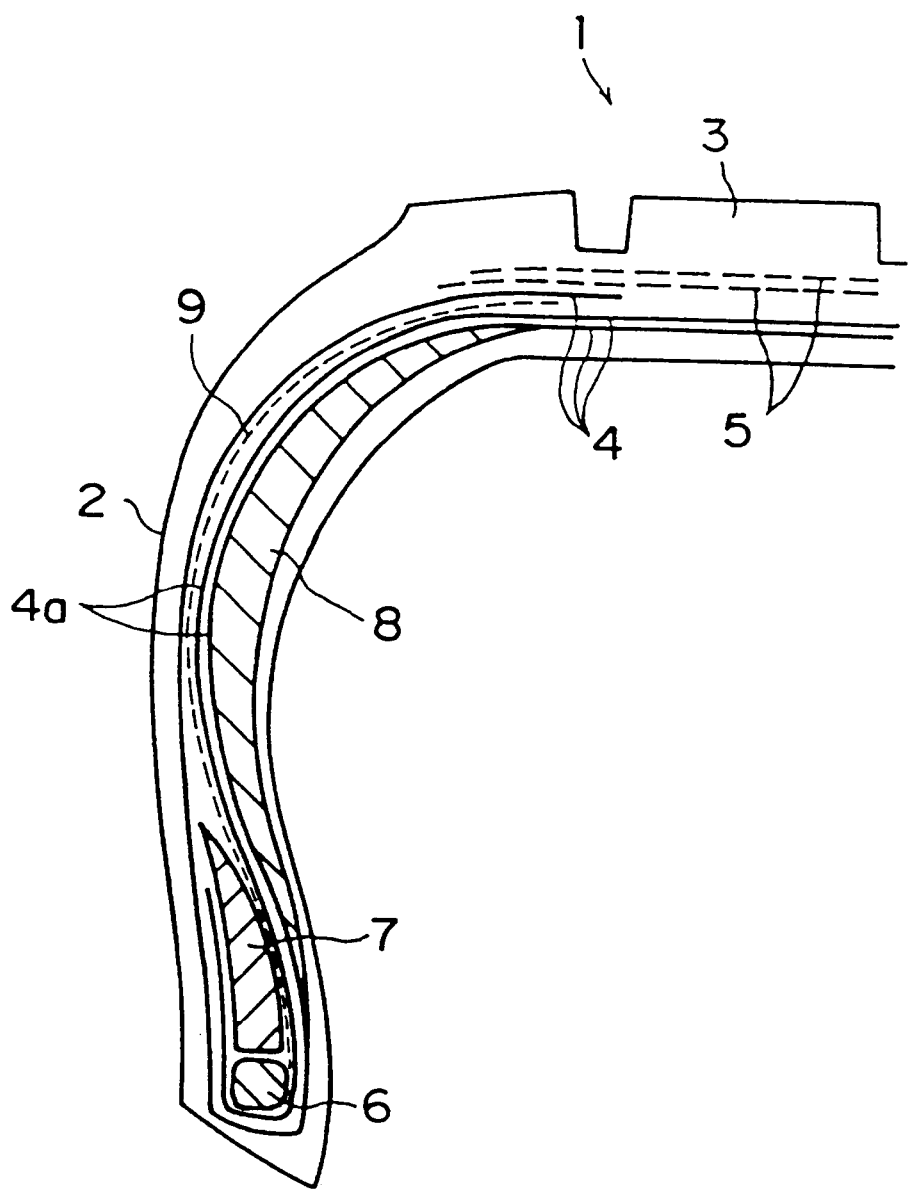
FIG. 8 shows a schematic presentation of the structure of a side portion (a carcass portion) of the pneumatic safe tire used in another example of the present invention.
Figure 9:
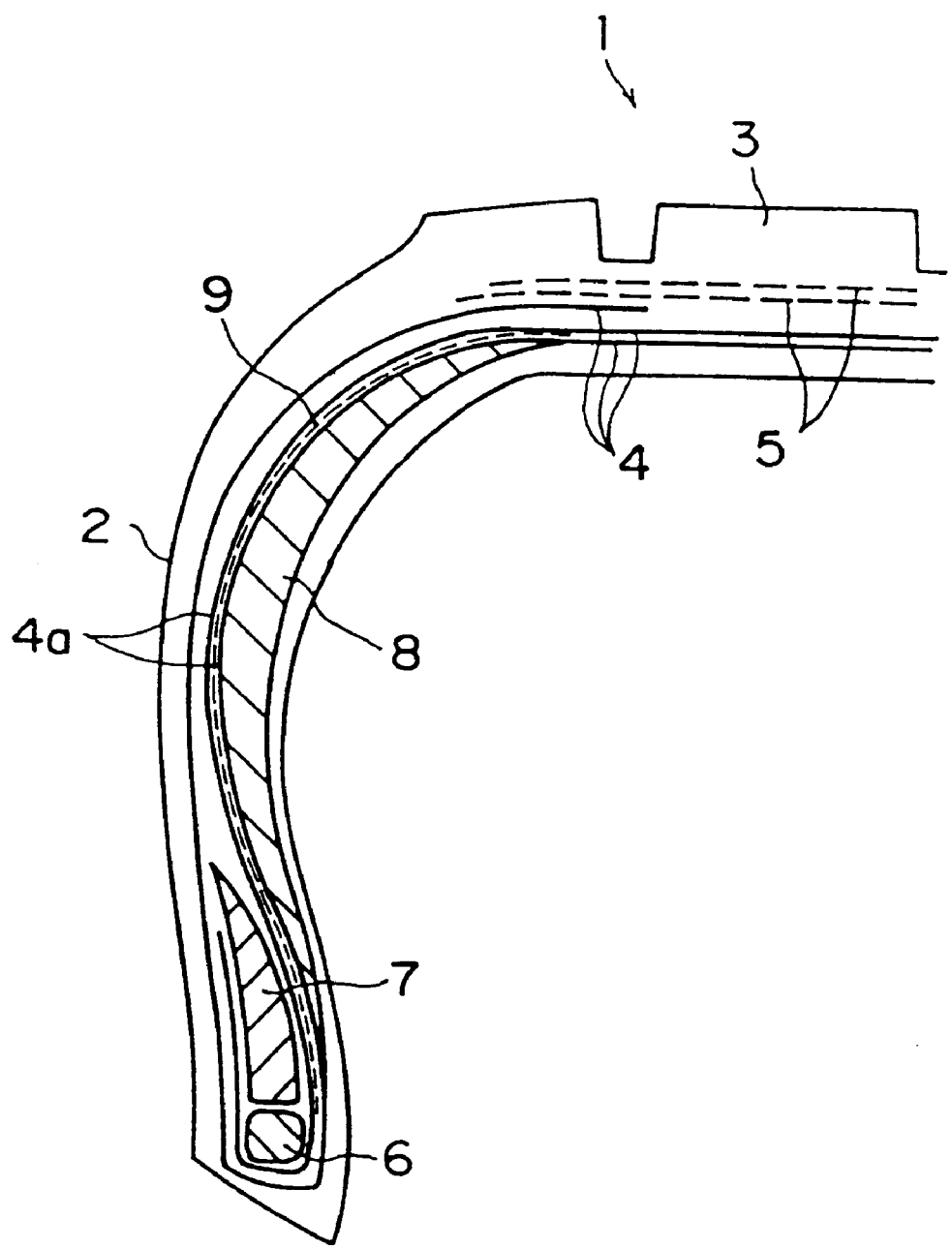
FIG. 9 shows a schematic presentation of the structure of a side portion (a carcass portion) of the pneumatic safe tire used in another example of the present invention.
Figure 10:
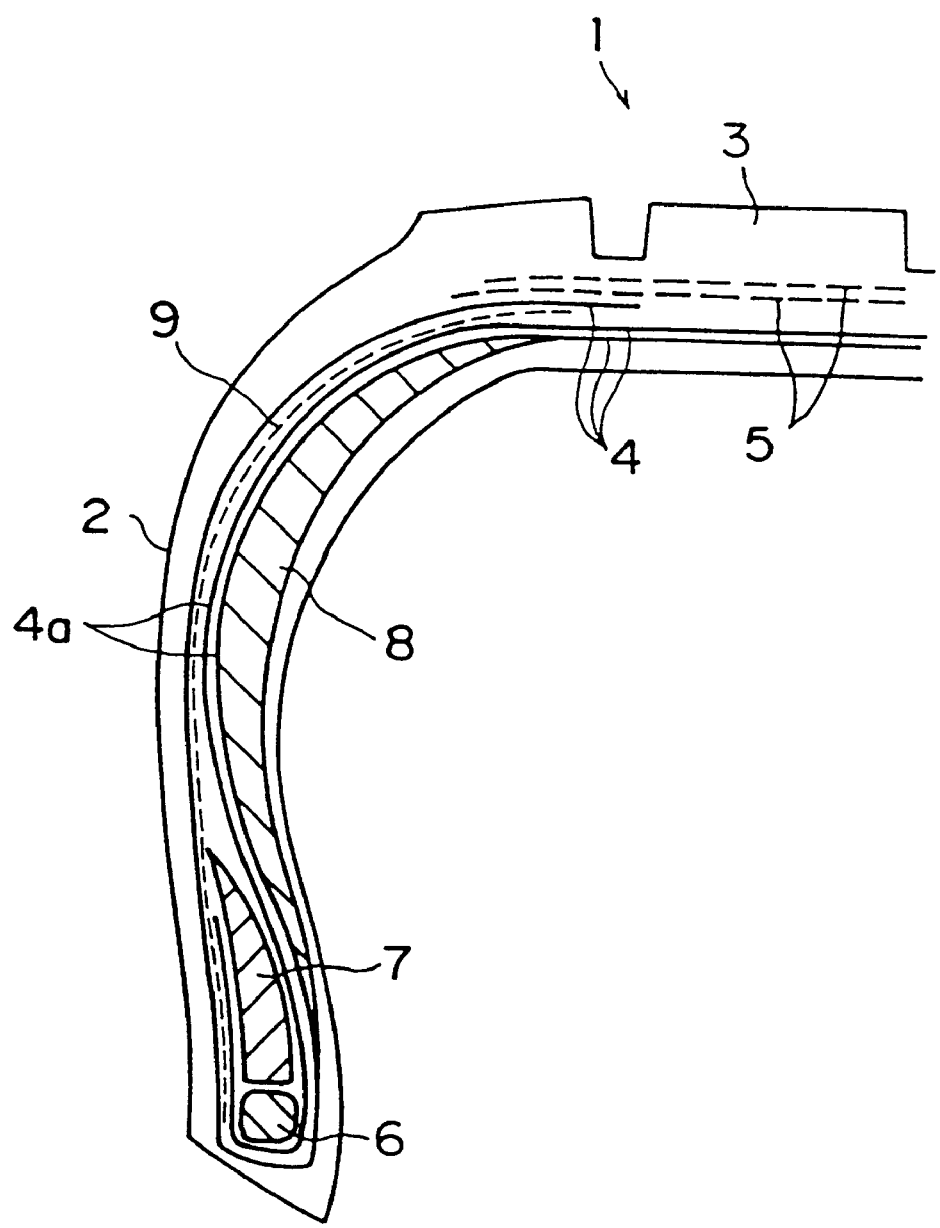
FIG. 10 shows a schematic presentation of the structure of a side portion (a carcass portion) of the pneumatic safe tire used in another example of the present invention.
Figure 11:
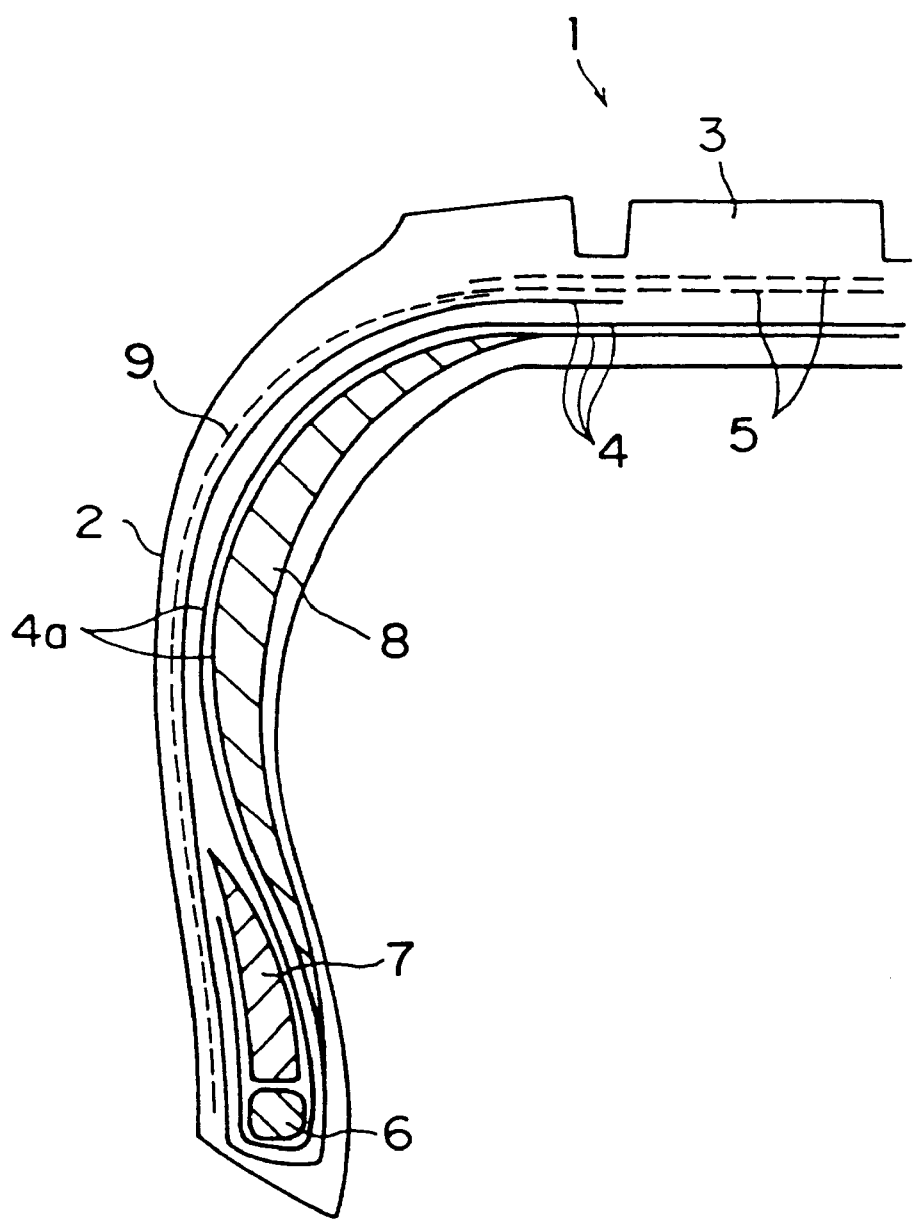
FIG. 11 shows a schematic presentation of the structure of a side portion (a carcass portion) of the pneumatic safe tire used in another example of the present invention.
Figure 12:
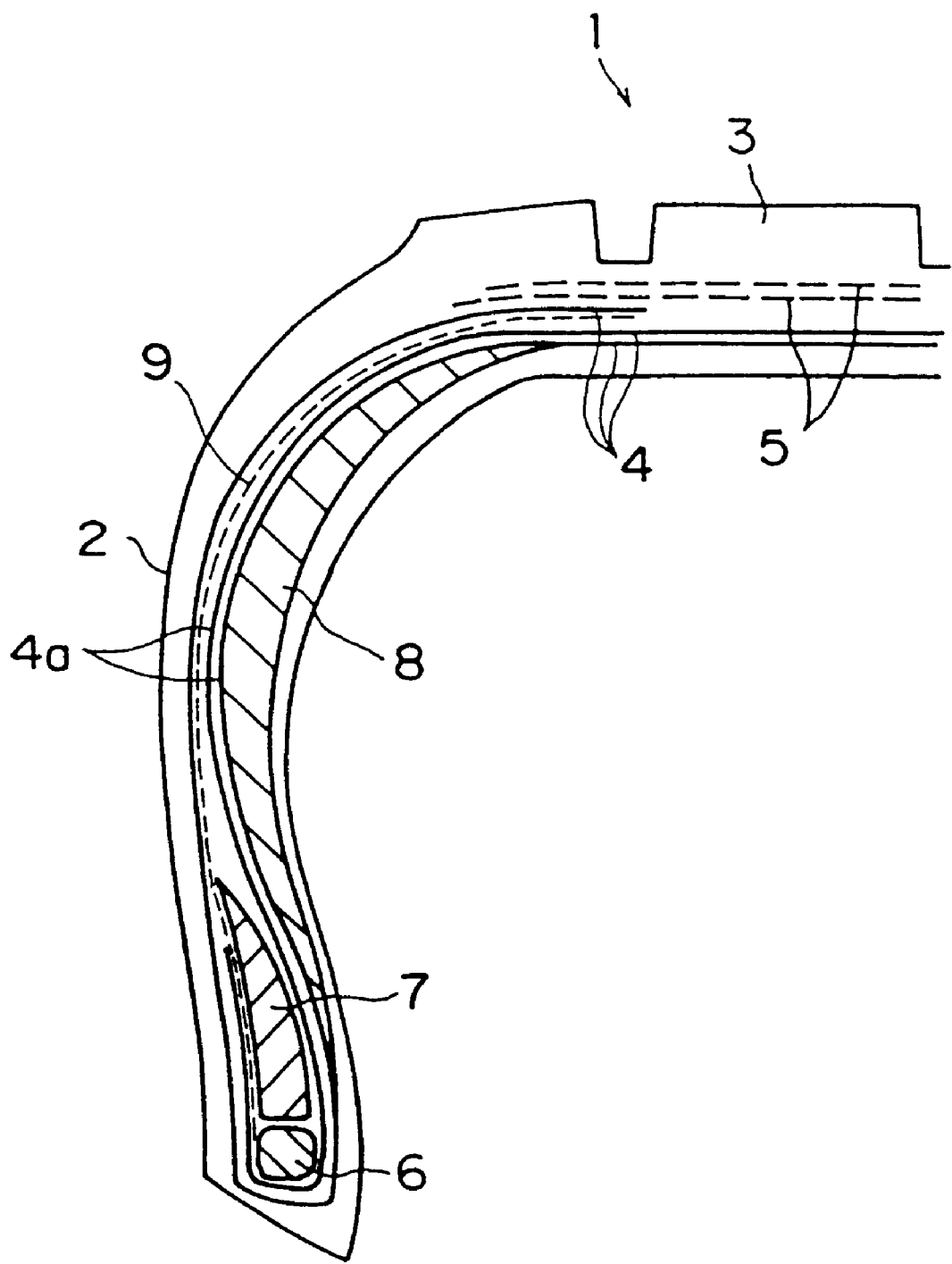
FIG. 12 shows a schematic presentation of the structure of a side portion (a carcass portion) of the pneumatic safe tire used in another example of the present invention.
Figure 13:
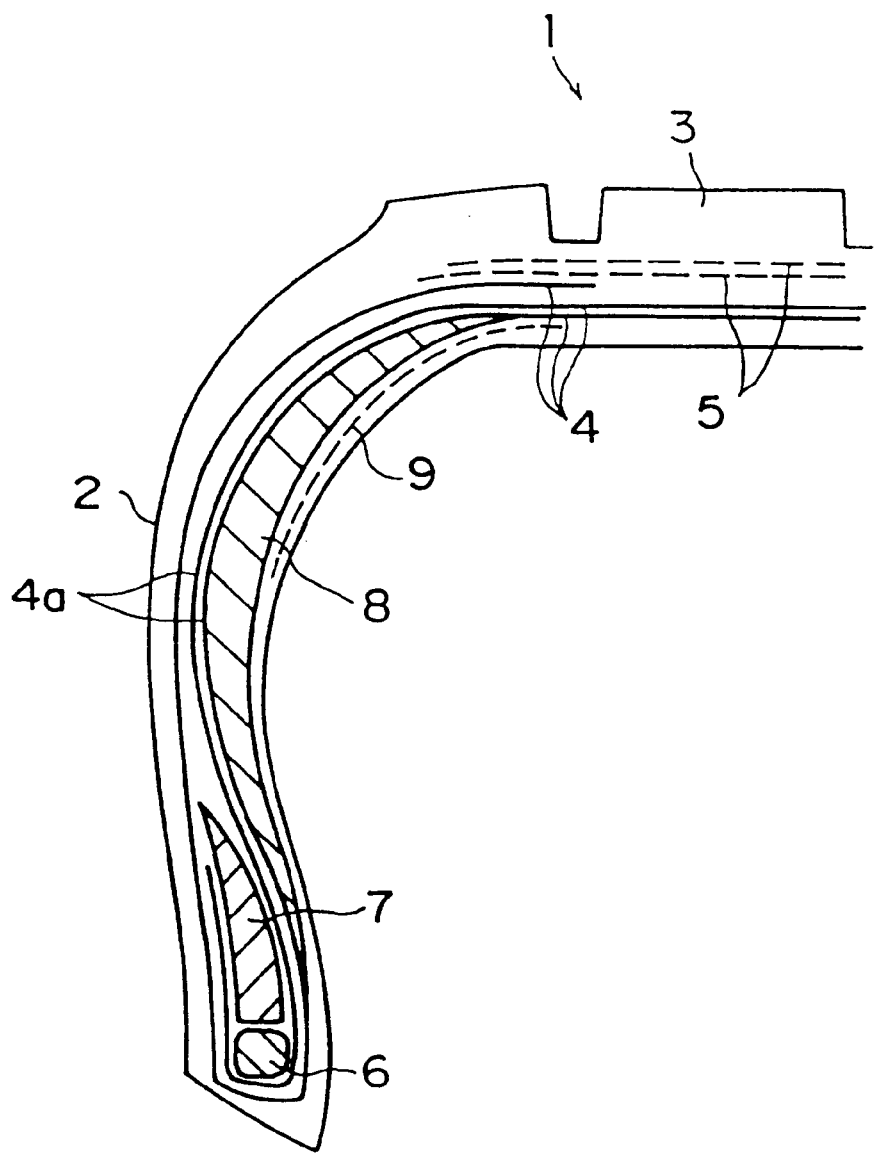
FIG. 13 shows a schematic presentation of the structure of a side portion (a carcass portion) of the pneumatic safe tire used in another example of the present invention.
Figure 14:
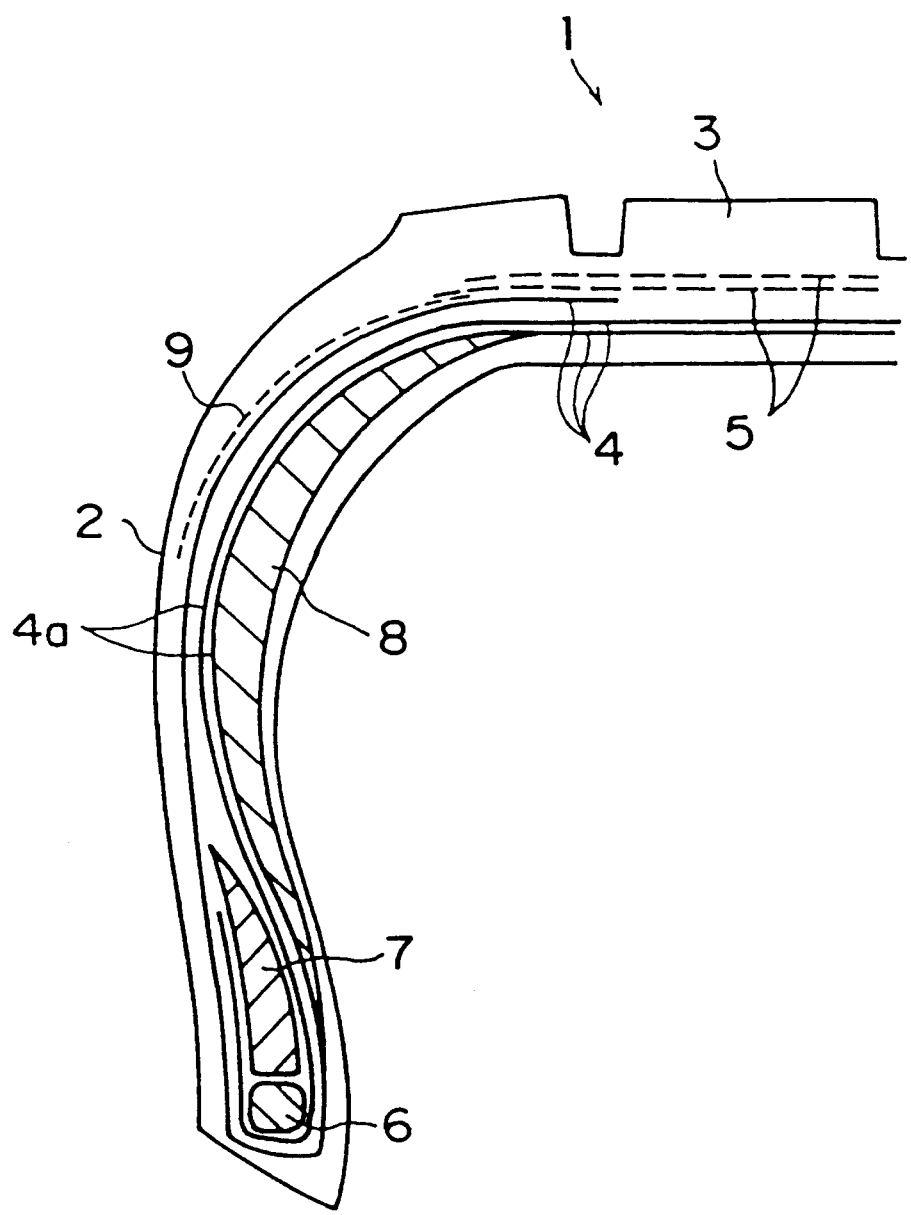
FIG. 14 shows a schematic presentation of the structure of a side portion (a carcass portion) of the pneumatic safe tire used in another example of the present invention.
Figure 15:
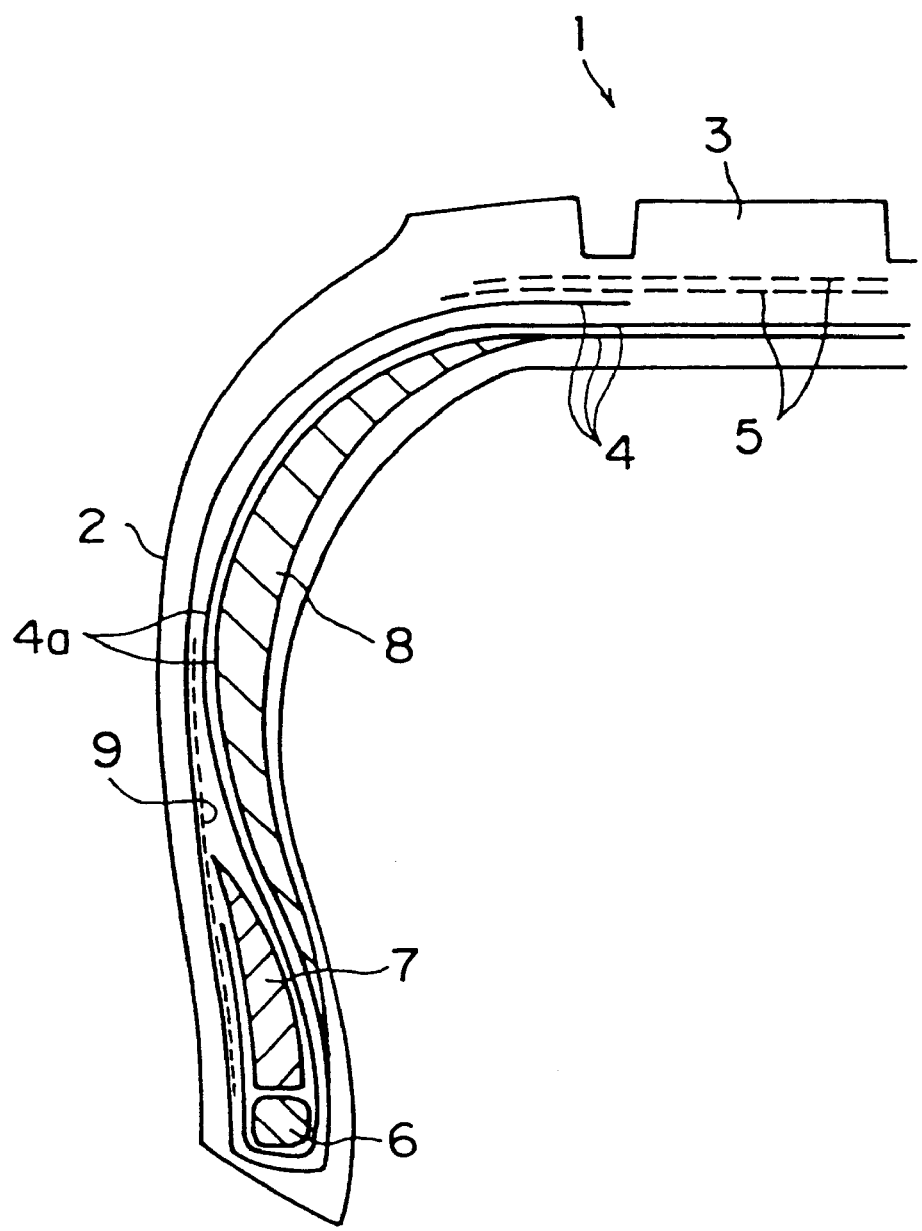
FIG. 15 shows a schematic presentation of the structure of a side portion (a carcass portion) of the pneumatic safe tire used in another example of the present invention.
Figure 16:
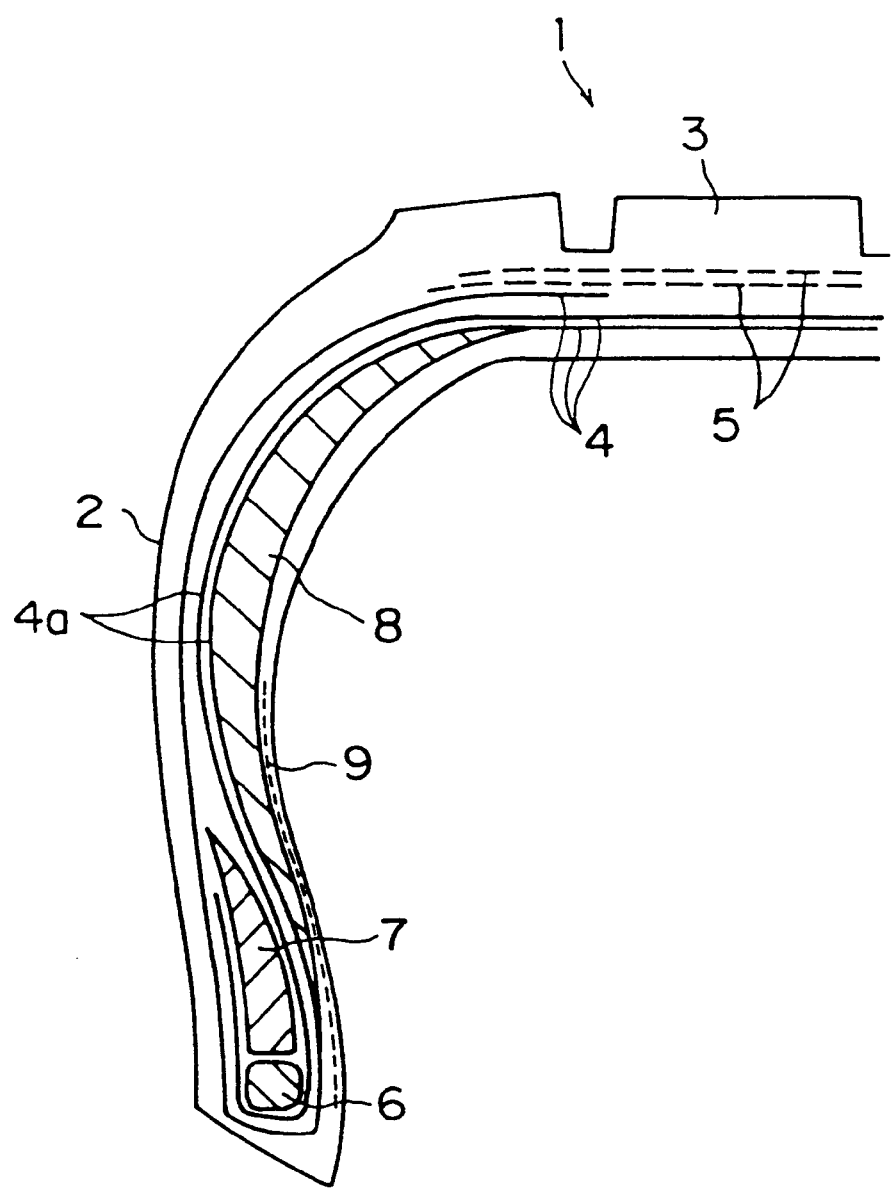
FIG. 16 shows a schematic presentation of the structure of a side portion (a carcass portion) of the pneumatic safe tire used in another example of the present invention.

Both ends of a turned up carcass ply 4a using a layer of Nylon 66 in which a cord direction is directed to a radial direction of the tire 1 are turned around a pair of right and left bead core 6 and bead fillers 7. Two layers of steel belts 5 are arranged above the carcass plies 4 in a radial direction of the tire, and a tread rubber 3 is arranged in a tire road contact surface portion provided above the steel belts 5. Further, side wall rubbers 2 are arranged on the carcass layer of both sides of the tread rubber 3. In FIG. 2, belt reinforcing layers 10 and 11 are arranged outside the belt layer 5.

An arrangement of the carcass portion in the tire side portion of the pneumatic tire in the present invention is exemplified in structures I, II, III, IV and V (in FIGS. 3, 4, 5, 6, and 7).

In the structures I and II, in addition to the two turned up carcass ply 4a using Nylon 66 cords, a reinforcing rubber layer 8 having a crescent cross section (for example, a maximum thickness 13 mm and a Shore hardness 80 degrees) is arranged inside the carcass ply 4a having a 3P carcass structure in which a sheet of down carcass 4b is arranged on the most front layer. In the structures III and IV, a reinforcing rubber layer 8 having a crescent cross section is arranged inside the carcass ply 4 having a 2P carcass structure in which an end of the carcass ply 4a using a sheet of steel cord is turned up to the tread portion enveloped structure. In the structure V, the reinforcing rubber layer 8 is arranged inside the carcass ply 4 having a 1P carcass portion in which a turned up ply forms an enveloped structure.

Further in structures II, IV and V, at least one sheet of rubber-filament fiber composite 9 having a specific size and composition is arranged inside the carcass ply 4a in the side wall portion.

EXAMPLES

The present invention is described more specifically with reference to the following examples. However, the present invention is not limited to the examples.

The melting point of the fiber was measured by a differential scanning calorimeter with a sample of about 5 mg at the speed of temperature increase of 10° C./min using a DSC manufactured by the DU PONT Company. The melting peak temperature was taken as the melting point.

The tensile stress of the rubber composition used for the composite was measured in accordance with the method of Japanese Industrial Standard K6301-1995.

The tensile strength and the elongation at break of the reinforcing cord of the carcass ply were measured in accordance with the method of Japanese Industrial Standard L1017-1983.

Properties of the tire were measured in accordance with the following methods:

(1) Durability in a run-flat condition

A tire was attached to a rim and inflated to an internal pressure of 3.0 kg/cm². After the tire was placed in a chamber at a room temperature of 38° C. for 24 hours, the core of the valve was removed to decrease the internal pressure to an atmospheric pressure. Then, the drum driving test of the tire was conducted under conditions of an applied weight of 570 kg, a speed of 89 km/hour, and a room temperature of 38° C. Durability in a run-flat condition was obtained from the driving distance at the time that the fracture occurred. Durability in a run-flat condition is shown as an index with reference to the value obtained in the control tire which is set to 100. The larger the index, the better the durability in a run-flat condition.

(2) Durability in an ordinary condition (Durability in an inflated condition)

A tire was attached to a rim and inflated to an internal pressure of 3.0 kg/cm$^2$. After the tire was placed in a chamber at a room temperature of 25° C. for 24 hours, the internal pressure was adjusted again to 3.0 kg/cm$^2$. Then, the tire was pressed to a drum rotating at a circumferential speed of 60 km/hour under an applied load which was twice the load specified by the Japanese Association of Tire Manufacturers and the driving distance at the time that the fracture occurred was measured. To decide whether the tire can actually be used, the result was rated as poor (cannot be used) when the driving distance was 20,000 km or less, and as good (can be used) when the driving distance exceeded 20,000 km.

Tires of size 225/60 R16 in which a reinforcing rubber layer having a crescent-shaped cross-section was disposed at an inner side of the carcass ply of the side wall portions were prepared in accordance with the conventional process.

The formulations of the rubber compositions used for the reinforcing rubber layer are shown in Table 1.

TABLE 1

|  | parts by weight |
|---|---|
| natural rubber | 30 |
| butadiene rubber[*1] | 70 |
| carbon black[*2] | 60 |
| softener[*3] | 5.0 |
| zinc oxide | 3.0 |
| stearic acid | 1.0 |
| antioxidant[*4] | 2.0 |
| vulcanization accelerator[*5] | 3.5 |
| sulfur | 5.0 |

[*1]BR01 (trademark, manufactured by JSR Corporation)
[*2]FEF
[*3]Spindle oil
[*4]NOCRAC 6C (trademark, manufactured by OUCHI SHINKO KAGAKU KOGYO Co., Ltd.)
[*5]NOCCELER NS (trademark, manufactured by OUCHI SHINKO KAGAKU KOGYO Co., Ltd.)

Rubber-filament fiber composites were prepared as follows: When a nonwoven fabric was not used as the filament fiber, a rubber-filament fiber composite was prepared by using a Banbury mixer. When a nonwoven fabric was used as the filament fiber, an unvulcanized rubber composition in a sheet form was pressed to both faces of the nonwoven fabric by a press at 70° C.

The rubber composition used was the same as that used for the reinforcing rubber layer.

The following four types of carcass structure were examined:

Structure I: A 3P structure having two turned-up carcass plies and one down carcass ply at an outer side of the turned-up plies.

Structure II: A 3P structure having two turned-up carcass plies, one down carcass ply at an outer side of the turned-up plies and a rubber-filament fiber composite disposed at an inner side of a rubber reinforcing layer having a crescent-shaped cross-section.

Structure III: A 2P structure having one turned-up carcass ply and one carcass ply whose end is turned up to a tread portion.

Structure IV: A 2P structure having one turned-up carcass ply, one carcass ply whose end is turned up to a tread portion, and a rubber-filament fiber composite disposed at an inner side of a rubber reinforcing layer having a crescent-shaped cross-section.

Structure V: A 1P structure having carcass ply whose end is turned up to a tread portion, and a rubber-filament fiber composite disposed at an inner side of a rubber reinforcing layer having a crescent-shaped cross-section.

The reinforcing cord of the carcass ply may use nylon 66 fiber (melting point: 260° C.) or nylon 46 fiber (melting point: 290° C.) was used.

The structure of the tires and the results of the evaluation of the properties of the tires are shown in Table 2.

TABLE 2-1

|  | Comparative Example 1 | Example 1 | Example 2 | Example 3 |
|---|---|---|---|---|
| Reinforcing component |  |  |  |  |
| reinforcing rubber layer composite | present | present | present | present |
| nonwoven fabric | absent | present | present | absent |
| filament fiber | absent | absent | absent | present |
| fiber | — | aramide | aramide | aramide |
| length of fiber (mm) | — | 50 | 50 | 50 |
| diameter of fiber (mm) | — | 0.02 | 0.02 | 0.02 |
| weight per area (g/m$^2$) | — | 50 | 50 | — |
| Carcass ply cord |  |  |  |  |
| material | nylon 66 | nylon 66 | nylon 46 | nylon 66 |
| structure | 1400dtex/2 | 1400dtex/2 | 1400dtex/2 | 1400dtex/2 |
| tensile strength (N/cord) | 230 | 230 | 224 | 230 |
| elongation at break (%) | 20.0 | 20.0 | 15.0 | 20.0 |
| structure | 3P | 3P | 3P | 3P |
| Tire structure | I | II | II | II |
| Durability in a run-flat condition (index)[*1] | 100 | 125 | 130 | 125 |
| Durability in an inflated condition | good | good | good | good |

[*1]Comparative Example 1 is the control run for Examples 1 to 3.

TABLE 2-2

|  | Comparative Example 2 | Example 4 | Example 5 |
|---|---|---|---|
| Reinforcing component |  |  |  |
| reinforcing rubber layer composite | present | present | present |
| nonwoven fabric | absent | present | present |
| filament fiber | absent | absent | absent |
| fiber | — | aramide | aramide |
| length of fiber (mm) | — | 50 | 50 |
| diameter of fiber (mm) | — | 0.02 | 0.02 |
| weight per area (g/m$^2$) | — | 50 | 50 |

TABLE 2-2-continued

| | Comparative Example 2 | Example 4 | Example 5 |
|---|---|---|---|
| Carcass ply cord | | | |
| material | nylon 66 | nylon 66 | nylon 46 |
| structure | 1400dtex/2 | 1400dtex/2 | 1400dtex/2 |
| tensile strength (N/cord) | 230 | 230 | 224 |
| elongation at break (%) | 20.0 | 20.0 | 15.0 |
| structure | 2P | 2P | 2P |
| Tire structure | III | IV | IV |
| Durability in a run-flat condition (index)[*1] | 100 | 130 | 135 |
| Durability in an inflated condition | good | good | good |

[*1]Comparative Example 2 is the control run for Examples 4 and 5.

It is shown by this invention that durability of a tire can be improved by disposing a rubber-filament fiber composite at side wall portions in all structures of the carcass plies.

In accordance with the present invention, a pneumatic tire for passenger cars showing excellent durability is provided because deterioration of adhesion in carcass ply does not take place during use, particularly during use in a run-flat condition.

What is claimed is:

1. A pneumatic tire for passenger cars comprising:
    a pair of left and right ring-shaped bead cores;
    a carcass layer in which a plurality of reinforcing cords disposed substantially parallel to each other are embedded in a covering rubber;
    a tread portion disposed at an outer side of said carcass layer in the radial direction of the tire; and
    a pair of side wall portions disposed at the left and right of said tread portion;
    wherein a rubber reinforcing layer having a crescent-shaped cross-section and at least one sheet of a rubber-filament fiber composite having a thickness of 0.05 to 2.0 mm which is formed from a rubber component and filament fibers having a diameter or a maximum cross-sectional dimension of 0.0001 to 0.1 mm and a length of 8 mm or more are disposed in each of said side wall portions; and
    said reinforcing carcass cords are made of an aliphatic polyamide fiber having a melting point of 250° C. or higher as measured by differential scanning calorimetry.

2. A pneumatic tire according to claim 1, wherein said filament fiber in said rubber-filament fiber composite is at least one fiber selected from the group consisting of aromatic polyamide fiber, rayon fiber, polyethylene naphthalate fiber, polyimide fiber, carbon fiber, glass fiber and steel wire.

3. A pneumatic tire according to claim 1, wherein said filament fiber in said rubber-filament fiber composite has a diameter or a maximum cross-sectional dimension of 0.0001 to 0.005 mm and a length of 10 mm or more.

4. A pneumatic tire according to claim 1, wherein the content of the filament fiber in said rubber-filament fiber composite is 4 to 50% by weight.

5. A pneumatic tire according to claim 1, wherein said rubber-filament fiber composite is formed from a rubber and a nonwoven fabric having a weight per area of 10 to 300 g/m$^2$.

6. A pneumatic tire according to claim 5, wherein said nonwoven fabric has a thickness measured under a pressure of 20 g/cm$^2$ of 0.1 to 0.5 mm.

7. A pneumatic tire according to claim 1, wherein said reinforcing carcass cords are made of at least one fiber selected from the group consisting of nylon 66 fiber and nylon 46 fiber.

\* \* \* \* \*